(12) United States Patent
Negoro

(10) Patent No.: US 10,173,749 B2
(45) Date of Patent: Jan. 8, 2019

(54) ELECTRICALLY ASSISTED BICYCLE

(71) Applicant: YAMAHA HATSUDOKI KABUSHIKI KAISHA, Iwata-shi, Shizuoka (JP)

(72) Inventor: Masanori Negoro, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 139 days.

(21) Appl. No.: 15/364,372

(22) Filed: Nov. 30, 2016

(65) Prior Publication Data

US 2017/0151998 A1 Jun. 1, 2017

(30) Foreign Application Priority Data

Dec. 1, 2015 (JP) .................................. 2015-234609

(51) Int. Cl.
| | |
|---|---|
| *B62M 6/50* | (2010.01) |
| *B62M 6/45* | (2010.01) |
| *B62J 6/00* | (2006.01) |
| *B60K 11/04* | (2006.01) |
| *B62K 11/04* | (2006.01) |
| *B62M 6/55* | (2010.01) |
| *B62K 25/28* | (2006.01) |
| *B62J 99/00* | (2009.01) |

(52) U.S. Cl.
CPC ............... *B62M 6/50* (2013.01); *B62J 6/001* (2013.01); *B62K 11/04* (2013.01); *B62M 6/45* (2013.01); *B62M 6/55* (2013.01); *B60Y 2200/13* (2013.01); *B60Y 2200/91* (2013.01); *B62J 2099/008* (2013.01); *B62K 25/286* (2013.01)

(58) Field of Classification Search
CPC . B61M 6/00; B61M 6/45; B61M 6/50; B61M 6/55; B62K 11/00; B62K 11/04; B62J 6/00; B62J 6/001
See application file for complete search history.

(56) References Cited

U.S. PATENT DOCUMENTS

| | | | | |
|---|---|---|---|---|
| 6,163,148 | A * | 12/2000 | Takada | .................... B62M 6/45 |
| | | | | 180/206.3 |
| 9,656,672 | B2 * | 5/2017 | Schieffelin | ............. B62M 9/122 |
| 2016/0159432 | A1 | 6/2016 | Nishikawa et al. | |
| 2017/0106866 | A1 * | 4/2017 | Schieffelin | ............. B62M 9/122 |
| 2017/0282919 | A1 * | 10/2017 | Schieffelin | ............. B62M 9/122 |
| 2018/0127054 | A1 * | 5/2018 | Venzal | ..................... B62M 6/50 |

FOREIGN PATENT DOCUMENTS

| | | |
|---|---|---|
| EP | 1 612 084 A1 | 1/2006 |
| EP | 2 604 499 A1 | 6/2013 |
| EP | 2 657 118 A1 | 10/2013 |
| JP | 2001-080569 A | 3/2001 |
| JP | 2001-122184 A | 5/2001 |
| JP | 2015-209200 A | 11/2015 |
| JP | 2016-107966 A | 6/2016 |

* cited by examiner

*Primary Examiner* — Yonel Beaulieu
(74) *Attorney, Agent, or Firm* — Keating and Bennett, LLP

(57) ABSTRACT

An electrically assisted bicycle includes a motor controller that calculates a command value which determines a magnitude of an assisting torque based on at least an output of a pedal torque detector. The motor controller switches between a first control and a second control, in which a time required for the assisting torque to change to meet a change in the pedal torque is shorter and the amount of change in the assisting torque to meet a change in the pedal torque is greater than in the first control.

14 Claims, 4 Drawing Sheets

ELECTRICALLY ASSISTED BICYCLE

CROSS REFERENCE TO RELATED APPLICATIONS

This application claims the benefit of priority to Japanese Patent Application No. 2015-234609 filed Dec. 1, 2015. The entire contents of this application is hereby incorporated herein by reference.

BACKGROUND OF THE INVENTION

1. Field of the Invention

The present invention relates to an electrically assisted bicycle.

2. Description of the Related Art

Electrically assisted bicycles are known from Japanese Patent Unexamined Publication JP-A 2001-122184 and the like in which motor torque is imparted to assist the pedal torque exerted by a rider.

In an electrically assisted bicycle described in JP-A 2001-122184, a plurality of response speeds are set at which an electric driving force is outputted in response to application of a human-powered driving force, such that the riding comfort is enhanced by switching the response speeds by a switch or according to a mean value of pedal torque.

SUMMARY OF THE INVENTION

Although electrically assisted bicycles are known in which the riding comfort is enhanced as in the electrically assisted bicycle described in JP-A 2001-122184 above, wider output characteristics of an electric motor are desired depending upon situations or preferences of the rider.

Preferred embodiments of the present invention provide an electrically assisted bicycle including an electric motor with a wide range of output characteristics.

An electrically assisted bicycle according to a preferred embodiment of the present invention includes a crank shaft, pedals that rotate the crank shaft, an electric motor that assists a force with which a rider presses the pedals, a torque sensor that outputs a signal corresponding to a pedal torque exerted on the pedals by the rider, a controller that calculates a command value which determines a magnitude of an assisting torque based on at least an output of the torque sensor, and an operator to be operated by the rider, wherein the controller is programmed or configured to, in response to an operation of the operator by the rider, switch between a first control and a second control in which a time required for the assisting torque to change to meet a change in the pedal torque is shorter and the amount of change in the assisting torque to meet a change in the pedal torque is greater than in the first control.

According to the electrically assisted bicycle described above, the assisting torque is outputted from the electric motor by the first control and the second control, wherein, in the second control, the rider feels an assisting sensation that is different from an assisting sensation that the rider feels in the first control.

The second control changes the assisting torque more quickly to meet a change in the pedal torque than the first control, and the second control changes the assisting torque more greatly to meet a change in the pedal torque than the first control. Due to this, for example, when the user selects the second control at the start of propelling the bicycle, the assisting torque is obtained as soon as the pedal torque is inputted, and a strong assisting torque is obtained in response to the inputted pedal torque.

Moreover, the time required for the assisting torque to change to meet a change in the pedal torque is longer in the first control than in the second control, and the amount of change in the assisting torque to meet a change in the pedal torque is smaller in the first control than in the second control. Consequently, since it is difficult for the assisting torque to change even though the pedal torque changes, for example, when the user selects the first control while propelling the bicycle at cruising speeds, the user feels a comfortable assisting sensation.

In this way, since the range of output characteristics of the electric motor is wide, the convenience of the user is enhanced.

According to a preferred embodiment of the present invention:

P(t) is a pedal torque at a current time t,

PA1(t) is an average value of a pedal torque during a span (t−t1),

PA2(t) is an average value during a span (t−2, |t−t2|≤|t−t1|), a, b, e, f, A1, and A2 (a/b<e/f) are constants, and α and β are variables (0≤α≤1, 0≤β≤1, α<β), the controller is preferably configured or programmed to calculate a command value T1 by the first control using the expression (1), and preferably is configured or programmed to calculate a command value T2 by the second control using the expression (2):

$$T1(t)=\{a^*P(t)^*\alpha+b^*PA1(t)^*(1-\alpha)\}^*A1 \qquad (1)$$

$$T2(t)=\{e^*P(t)^*\beta+f^*PA2(t)^*(1-\beta)\}^*A2 \qquad (2)$$

According to a preferred embodiment of the present invention:

P(t) is a pedal torque at a current time t,

QA1(t) is an average value of a pedal torque during a past 1/g rotation of the crank shaft at the current time t, QA2(t) is an average value of pedal torque during a past 1/h (g≤H) rotation of the crank shaft, a, b, e, f, A1, and A2 (a/b<e/f) are constants, and α and β are variables (0≤α≤1, 0≤β≤1, α<β), the controller preferably is configured or programmed to calculate a command value T1 by the first control using the expression (3), and preferably is configured or programmed to calculate a command value T2 by the second control using the following expression (4):

$$T1(t)=\{a^*P(t)^*\alpha+b^*QA1(t)^*(1-\alpha)\}^*A1 \qquad (3)$$

$$T2(t)=\{e^*P(t)^*\beta+f^*QA2(t)^*(1-\beta)\}^*A2 \qquad (4)$$

According to a preferred embodiment of the present invention, the controller preferably is configured or programmed to set α and β based on a crank speed c calculated from a change in pedal torque or a crank speed c calculated from an output of the crank rotation detector such that α and β become greater as the crank speed c becomes slower and α and β become smaller as the crank speed c becomes faster.

According to a preferred embodiment of the present invention, the bicycle includes a wheel speed sensor that outputs a signal corresponding to a wheel speed of the wheel, and the controller preferably is configured or programmed to set α and β based on a wheel speed v calculated from an output of the wheel speed sensor such that α and β become greater as the wheel speed v becomes slower and α and β become smaller as the wheel speed v becomes faster.

According to a preferred embodiment of the present invention, when the controller switches between the first control and the second control while the vehicle is being propelled, in case an amount of change from the current command value to the command value calculated after the switching of the controls exceeds a predetermined upper limit value, the controller preferably sets the command value at the upper limit value in place of the calculated command value.

According to the electrically assisted bicycle described above, the amount of change in the command value is significantly reduced or minimized, such that the switching between the first control and the second control is executed smoothly.

According to a preferred embodiment of the present invention, a bicycle includes an indicator which is illuminated in different colors or different patterns in association with the controller executing the first control or the second control.

According to the electrically assisted bicycle described above, by looking at the indicator, the user is able to easily verify which of the first control and the second control is currently being executed. The different patterns include, for example, turning on, turning off, and flashing of the indicator.

According to preferred embodiments of the present invention, it is possible to provide an electrically assisted bicycle including an electric motor with a wide range of output characteristics.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, referring to FIG. 1, a preferred embodiment of the present invention will be described. Dimensions of constituent elements in FIG. 1 do not always represent actual dimensions of the constituent elements and dimensional ratios of the constituent elements.

In the following description, front, rear, left and right mean front, rear, left and right as viewed from a rider who is seated on a seat 24 of an electrically assisted bicycle while gripping handgrips on a handlebar 23.

Figure 1:
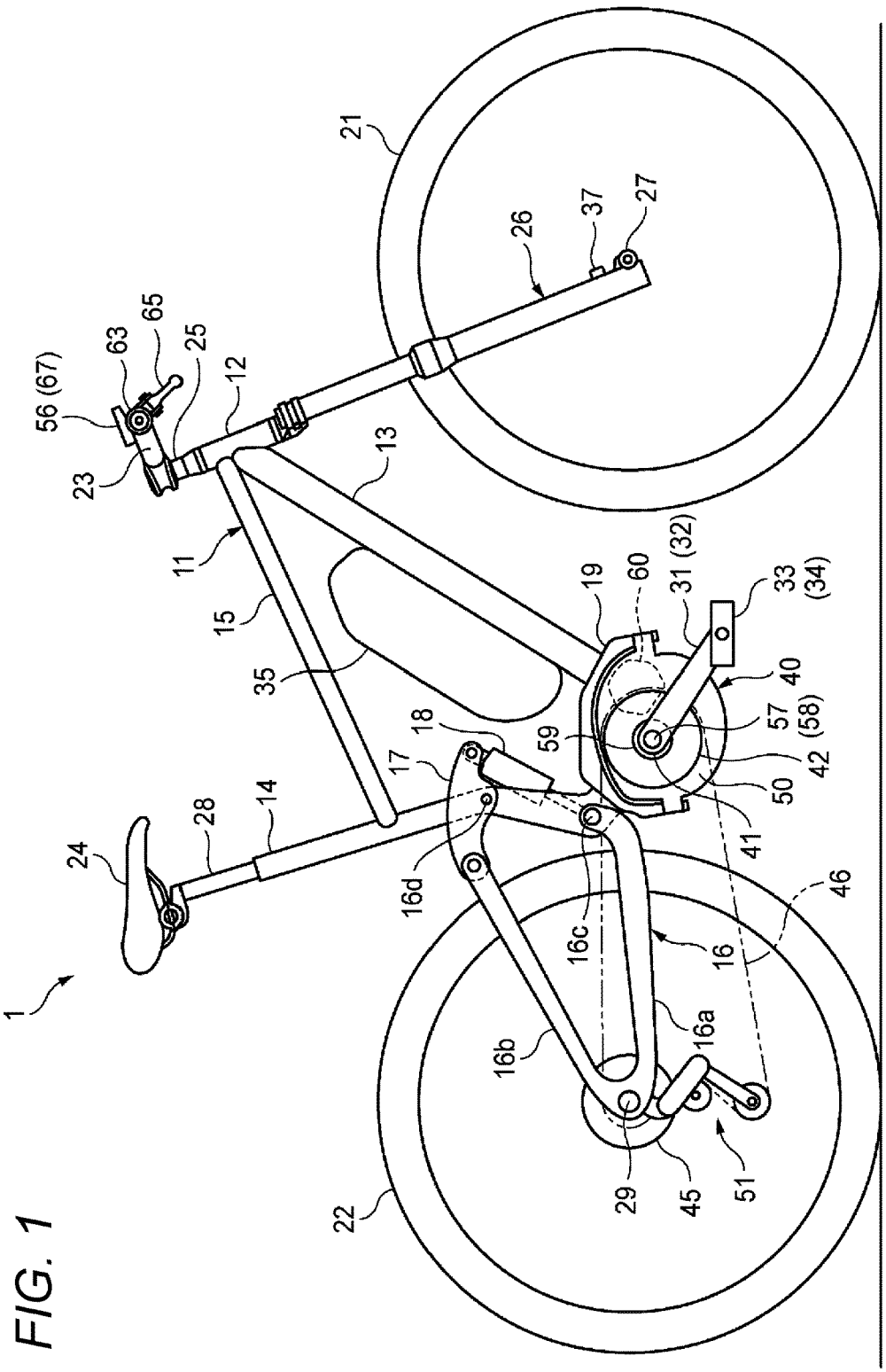
FIG. 1 is a side view of an electrically assisted bicycle according to a preferred embodiment of the present invention.

As shown in FIG. 1, an electrically assisted bicycle 1 includes pedals 33, 34 and an electric motor 60. The electrically assisted bicycle 1 is driven by a total drive torque including a pedal torque generated by a rider pressing the pedals 33, 34 and a motor torque outputted from the electric motor 60. The motor torque of the electric motor 60 defines an assisting torque which assists the rider in pressing the pedals 33, 34. Additionally, in the electrically assisted bicycle 1, the electric motor 60 provides an assisting torque to a rear wheel 22 to assist the rider in pushing the bicycle while walking with the handlebar 23 gripped by the rider, which is referred to as a walk-push assisting torque.

The electrically assisted bicycle 1 includes a body frame 11 which extends in a front-to-rear direction. The electrically assisted bicycle 1 also includes a front wheel 21, the rear wheel 22, a handlebar 23, a seat 24 and a power unit 40.

The body frame 11 includes a head tube 12, a down tube 13, a top tube 15, a seat tube 14 and a swing arm 16 which is suspended on the seat tube 14 so as to swing freely in an up-and-down direction. The head tube 12 is disposed at a front portion of the electrically assisted bicycle 1. A front portion of the down tube 13 which extends obliquely downwards to the rear and a front portion of the top tube 15 are connected to the head tube 12. A lower end portion of the seat tube 14 and a rear portion of the down tube 13 are connected to a bracket 19 which extends in a front-to-rear direction of a vehicle body. The seat tube 14 extends obliquely upwards to the rear from a rear end portion of the bracket 19.

A handlebar stem 25 is inserted into the head tube 12 so as to turn freely. The handlebar 23 is fixed to an upper end portion of the handlebar stem 25. A front fork 26 including a hydraulic shock absorber is fixed to a lower end portion of the handlebar stem 25. The front wheel 21 is supported rotatably at a lower end portion of the front fork 26 by an axle shaft 27. A front wheel speed sensor 37 is provided at the lower end portion of the front fork 26 to detect a vehicle speed based on rotations of the front wheel 21.

A seat post 28 is inserted into the cylindrical seat tube 14. The seat 24 is provided at an upper end portion of the seat post 28.

The swing arm 16 includes a pair of chain stays 16a and a pair of seat stays 16b integrated into one unit. The pair of chain stays 16a is supported on the seat tube 14 at front ends thereof via a first pivot 16c to swing freely and to hold the rear wheel 22 therebetween from left- and right-hand sides of the rear wheel 22. The pair of chain stays 16a extends from the first pivot 16c towards a rotational center of the rear wheel 22. A link 17 is supported at a middle portion of the seat tube 14 so as to swing in the up-and-down direction about a second pivot 16d. The pair of seat stays 16b is connected to the seat tube 14 at front ends thereof via the link 17, and rear ends thereof extend towards the rotational center of the rear wheel 22. A hydraulic shock absorber 18 is disposed between the other end of the link 17 and the seat tube 14. The rear wheel 22 is supported rotatably at rear end portions of the chain stays 16a and the seat stays 16b.

A battery 35 is disposed on the down tube 13, and the battery 35 supplies electric power to the electric motor 60 of the power unit 40. The battery 35 includes a chargeable-dischargeable rechargeable battery and a battery controller, which are not shown. The battery controller controls the charging and discharging of the rechargeable battery and monitors an output current from the battery and a residual capacity or the state of charge of the rechargeable battery.

The power unit 40 includes a crank shaft 41, a crank rotation input shaft (not shown), a pedal torque detector 57, a crank rotation detector 58, the electric motor 60 and a speed reduction gear (not shown) and a resultant force output shaft 59, which are incorporated in a unit case 50 as a unit. The power unit 40 is connected to the bracket 19 of the body frame 11 with bolts, for example.

The crank shaft 41 is located rotatably below the seat tube 14. The crank shaft 41 penetrates the unit case 50 in a left-to-right direction and is supported thereon. Crank arms 31, 32 are attached to both end portions of the crank shaft 41. The pedals 33, 34 are attached individually to distal ends of the crank arms 31, 32 in a rotatable manner.

The crank rotation input shaft (not shown) has a cylindrical shape and the crank shaft 41 is inserted through an interior thereof. One end of the crank rotation input shaft is spline connected to the crank shaft 41, and the other end thereof is connected to the resultant force output shaft 59 via a one-way clutch (not shown).

The pedal torque detector 57 (an example of a torque sensor) is disposed on a circumference of the crank rotation input shaft to detect a pedal torque inputted into the crank shaft 41 via the pedals 33, 34 by the rider.

The crank rotation detector 58 detects rotation at an input side of the crank rotation input shaft or the one-way clutch which is connected to the crank rotation input shaft when the rider rotates the pedals 33, 34.

The electric motor 60 is disposed at the front of the crank shaft 41 within the unit case 50. The rotation of the electric motor 60 is transmitted to the resultant force output shaft 59 via the speed reduction gear (not shown) and a motor one-way clutch (not shown).

A drive sprocket 42 is attached to a right end of the resultant force output shaft 59 which is concentric with the crankshaft 41. The drive sprocket 42 rotates together with the crank shaft 41. A plurality of driven sprockets 45 including a corresponding number of gears are positioned concentrically about a rear axle shaft 29 of the rear wheel 22. The driven sprockets 45 are connected to the rear wheel 22 via a one-way clutch, not shown.

An endless chain 46 extends between the drive sprocket 42 and any one of the driven sprockets 45 and wraps around a rear derailer 51. This allows the drive sprocket 42 to rotate together with the resultant force output shaft 59 when the rider presses to rotate the pedals 33, 34 with his or her feet. Further, the rotation of the drive sprocket 42 is transmitted to any one of the driven sprockets 45 by way of the chain 46 to drive the rear wheel 22.

The electric motor 60 is disposed at the front of the crank shaft 41 within the unit case 50. Electric power is supplied to the electric motor 60 from the battery 35. When electric power is supplied to the electric motor 60, the electric motor 60 rotates. The rotation of the electric motor 60 is combined with human power on the resultant force output shaft 59 and is then transmitted to the chain 46 via the drive sprocket 42. In this way, when electric power is supplied to the electric motor 60, motor torque is generated in the electric motor 60. This motor torque is transmitted to the rear wheel 22 via the chain 46.

Grip portions 63 are provided at left and right end portions of the handlebar 23. The grip portions 63 extend in or substantially in the left-to-right direction. The rider grips these grip portions 63.

Brake levers 65 are provided near the grip portions 63. When the rider operates the right brake lever 65 with his or her right hand, a braking force is imparted to the front wheel 21. When the rider operates the left brake lever 65 with his or her left hand, a braking force is imparted to the rear wheel 22.

An operator 56 is provided near the grip portion 63. The operator 56 is able to be operated by a finger of a hand of the rider by which the rider grips the grip portion 63. The operator 56 is connected to a control apparatus 100 including a motor controller 95, which will be described below, via a signal line (whose illustration is omitted).

In the electrically assisted bicycle 1 configured described above, the electric motor 60 is controlled by the control apparatus 100 to apply a motor torque to the rear wheel 22.

Figure 2:
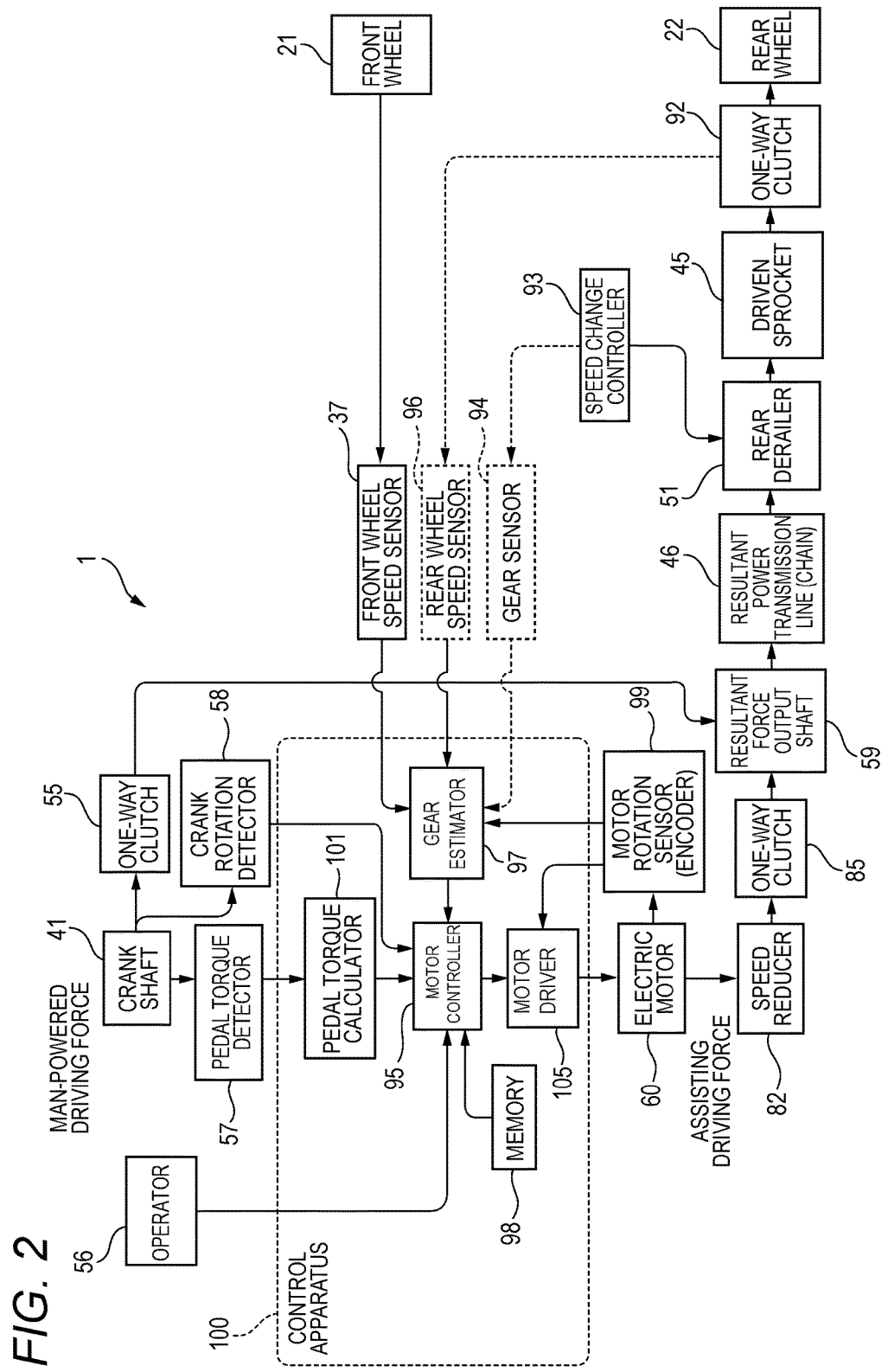
FIG. 2 is a block diagram showing functions of the electrically assisted bicycle according to a preferred embodiment of the present invention.

FIG. 2 is a block diagram showing functions of the electrically assisted bicycle 1. As shown in FIG. 2, the control apparatus 100 includes a pedal torque calculator 101, the motor controller 95, a motor driver 105, a gear estimator 97 and a memory 98. The operator 56 is connected to the motor controller 95.

Next, a power transmission line will be described.

When the rider presses the pedals 33, 34 to rotate the crank shaft 41, the rotation of the crank shaft 41 is transmitted to the resultant force output shaft 59 by way of a one-way clutch 55. The one-way clutch 55 transmits only a forward rotation of the crank shaft 41 to the resultant force output shaft 59 and does not transmit a reverse rotation of the crank shaft 41 to the resultant force output shaft 59. The rotation of the resultant force output shaft 59 is transmitted to the chain 46.

The rotation of the chain 46 is transmitted to the desired driven sprocket 45 by the rear derailer 51 on the rear wheel 22 side. The rotation of the driven sprockets 45 is transmitted to the rear wheel 22 by way of a one-way clutch 92.

The rear derailer 51 shifts gears in response to an operation of a speed change controller 93 by the rider. A gear sensor 94 is provided on the speed change controller 93, and the gear sensor 94 transmits the information on the number of gears in the speed change controller 93 to the gear estimator 97.

The one-way clutch 92 transmits the rotation of the driven sprocket 45 to the rear wheel 22 only when the rotation speed of the driven sprocket 45 is faster than the rotation speed of the rear wheel 22. When the rotation speed of the driven sprocket 45 is slower than the rotation speed of the rear wheel 22, the one-way clutch 92 does not transmit the rotation of the driven sprocket 45 to the rear wheel 22. A rear wheel speed sensor 96 is provided on the one-way clutch 92, and the rear wheel speed sensor 96 transmits the information on the rotation speed of the rear wheel 22 to the gear estimator 97.

The rotation of the electric motor 60 is transmitted to a one-way clutch 85 via a speed reducer 82. The one-way clutch 85 transmits only a rotation of the electric motor 60 to the resultant force output shaft 59 in a direction in which the speed reducer 82 rotates the resultant force output shaft 59 forward, but does not transmit a rotation of the electric motor 60 to the resultant force output shaft 59 in a direction in which the speed reducer 82 rotates the resultant force output shaft 59 reversely.

In this way, in the electrically assisted bicycle 1 according to the present preferred embodiment, a pedal torque inputted into the crank shaft 41 and a motor torque generated in the electric motor 60 are combined together at the resultant force output shaft 59 to be transmitted to the chain 46.

Next, signal lines will be described.

When the rider rotates the crank shaft 41, the pedal torque detector 57 which is provided on the vehicle generates a signal corresponding to the pedal torque inputted into the crank shaft 41. The pedal torque detector 57 inputs the signal into the pedal torque calculator 101.

The pedal torque calculator 101 converts the signal from the pedal torque detector 57 into the pedal torque exerted on the pedals 33, 34 by the rider. The pedal torque calculator 101 inputs the value of the pedal toque into the motor controller 95.

The crank rotation detector 58 is a sensor that detects the phase of the crank shaft 41. The crank rotation detector 58 generates a signal corresponding to the phase of the crank shaft 41. The crank rotation detector 58 inputs the signal into the motor controller 95.

The front wheel speed sensor 37 transmits a signal of the rotation speed of the front wheel 21 to the gear estimator 97. The gear estimator 97 estimates a selected gear from the rotation speed of the front wheel 21 and transmits the information to the motor controller 95.

A motor rotation sensor 99 is provided on the electric motor 60. The motor rotation sensor 99 detects a revolution speed of the electric motor 60 and transmits the detected revolution speed to the gear estimator 97 and the motor driver 105.

The motor controller 95 calculates a command value to impart an appropriate assisting force from the outputs from the pedal torque calculator 101, the crank rotation detector 58 and the gear estimator 97 and an output from information stored in the memory 98, and transmits the calculated command value to the motor driver 105.

The motor driver 105 supplies electric power corresponding to the command value to the electric motor 60 from the battery 35 based on the command value from the motor controller 95. Then, the electric motor 60 to which the electric power is supplied is driven to generate a predetermined motor torque.

In this way, the motor controller 95 causes the electric motor 60 to generate a motor torque to assist the rider in pressing the pedals 33, 34 when propelling the vehicle.

In the electrically assisted bicycle 1 described heretofore, the motor controller 95 determines a command value based on a first control or a second control. In the second control, compared with the first control, a time required to change an assisting torque is shorter than a time required to change a pedal torque, and an amount of change of the assisting torque is greater than an amount of change of the pedal torque.

Figure 3:
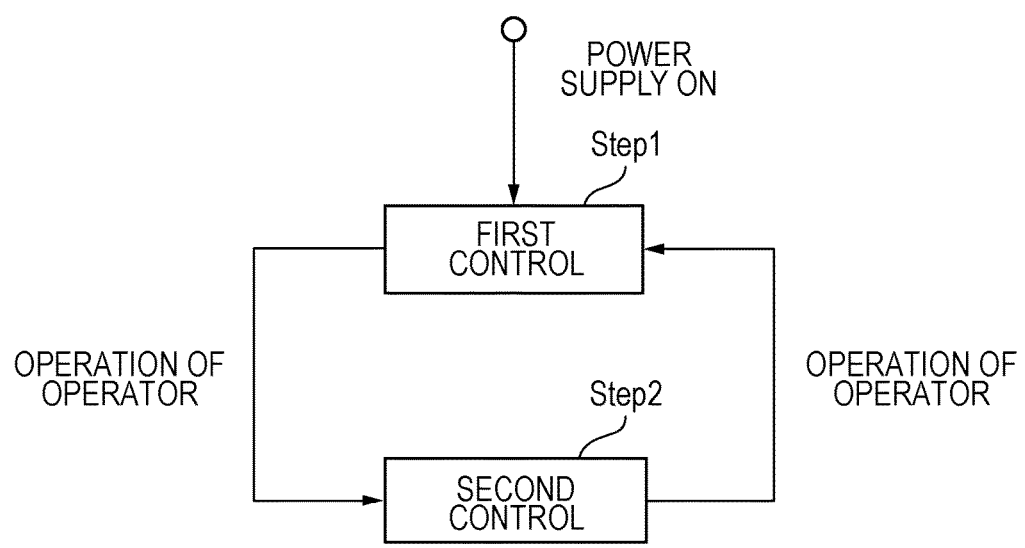
FIG. 3 is a flowchart showing a control switching operation by operating an operator on the electrically assisted bicycle according to a preferred embodiment of the present invention.

FIG. 3 is a flowchart showing a control switching operation by operating the operator 56 of the electrically assisted bicycle 1 according to the present preferred embodiment. As shown in FIG. 3, in the electrically assisted bicycle 1, the first control is selected after a power supply of the vehicle is switched on (step 1). With the first control selected, when the rider operates the operator 56, the second control is selected (step 2). With the second control selected, when the rider operates the operator 56, the first control is selected (step 1).

Due to this, for example, in the event that a momentary assist is wanted as when riding over a bump at the start of propelling the bicycle with the first control selected normally, the rider operates the operator 56 to select the second control, thus making it possible to obtain an assisting torque that enables the bicycle to start smoothly or ride over the bump.

Figure 4:
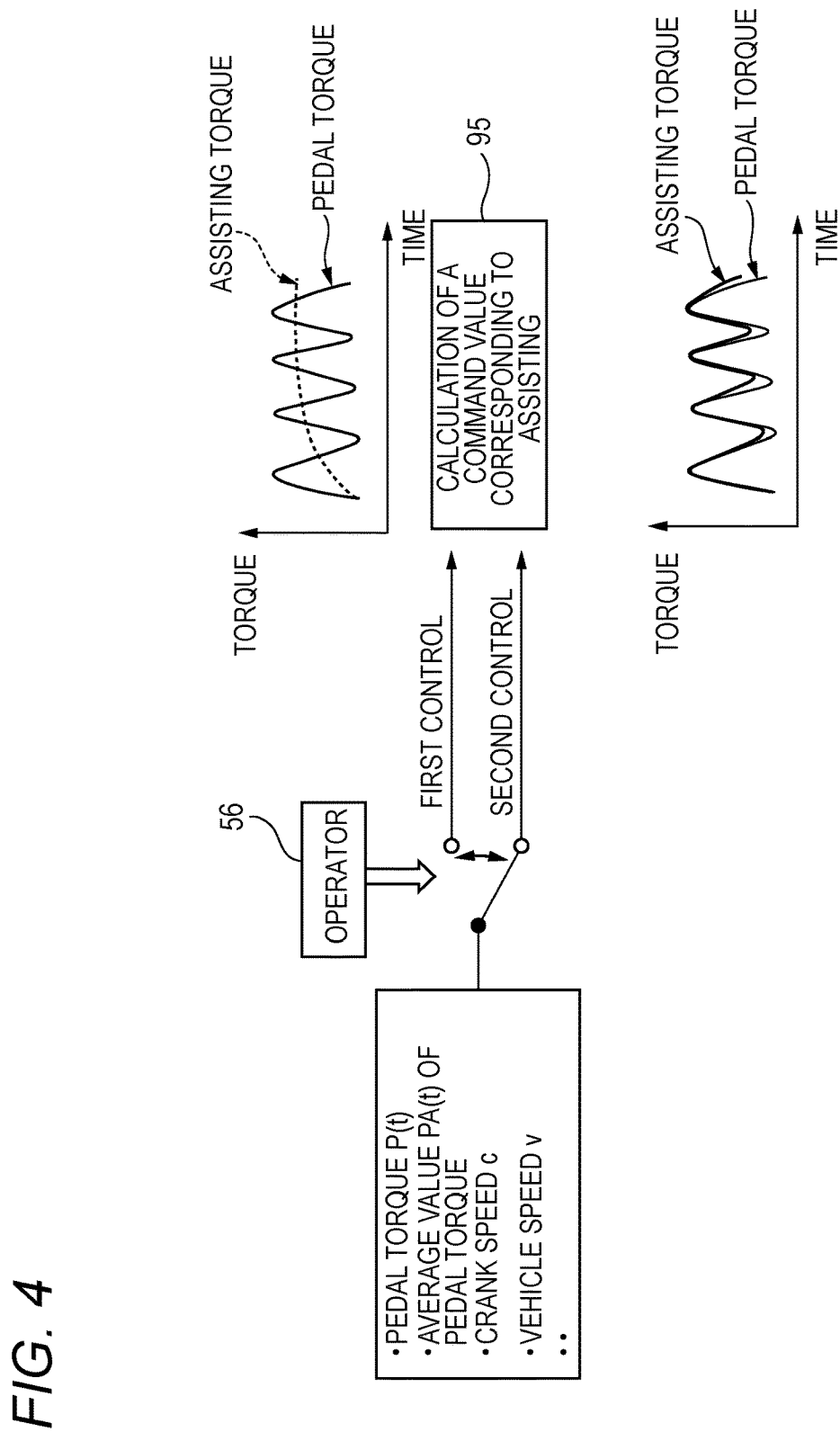
FIG. 4 is a schematic diagram illustrating a control switching operation by a motor controller.

FIG. 4 is a schematic diagram illustrating a control switching operation by the motor controller 95.

As shown in FIG. 4, the motor controller 95 performs the switching from the first control to the second control or from the second control to the first control as a result of the operator 56 being operated. The motor controller 95 calculates a command value corresponding to a required assisting torque based on a value P(t) of the pedal torque, an average value PA(t) of the pedal torque, a crank speed c, a vehicle speed v and the like.

Next, non-limiting examples of calculating a command value which is transmitted from the motor controller 95 to the motor driver 105 in the first control and the second control will be described.

Basically, the motor controller 95 calculates a component of assisting torque which corresponds to pedal torque P(t) at a time t, calculates a component of assisting torque which corresponds to an average value PA1(t) of the pedal torque at the time t and determines on assisting torque T(t) at the time t by totaling both the components of assisting torque.

The motor controller 95 calculates the assisting torque according to the first control or the second control which differs from the first control. The motor controller 95 calculates a command value corresponding to the assisting torque and transmits the calculated command value to the motor driver 105.

In the first control, the assisting torque T1(t) is calculated based on the following expression (1).

$$T1(t) = \{a*P(t)*\alpha + b*PA1(t)*(1-\alpha)\}*A1 \quad (1)$$

where, P(t) is a pedal torque at the current time t, PA1(t) is an average value of a pedal torque during a span (t−t1), a, b and A1 are constants, and a is a variable of $0 \leq \alpha \leq 1$.

In the second control, the assisting torque T2(t) is calculated based on the following expression (2).

$$T2(t) = \{e*P(t)*\beta + f*PA2(t)*(1-\beta)\}*A2 \quad (2)$$

where P(t) is a pedal torque at the current time t, PA2(t) is an average value of a pedal torque during a span (t−t2), in relation to t1, t2, |t−t2|≤|t−t1|, e, f and A2 are constants, (a/b<e/f), β is a variable of $0 \leq \beta \leq 1$, and in relation to α and β, α<β.

Here, in relation to the average values of the pedal torque, the spans where the average values are obtained differ from each other between the first control and the second control. In the case of |t−t2|<|t−t1|, the time required for the assisting torque to change to meet a change in the pedal torque P(t) tends to be longer with the average value PA1(t) of the pedal torque used in the first control than with the average value PA2(t) of the pedal torque used in the second control.

t1 may be equal to t2 (t1=t2). In this case, |t−t2|=|t−t1|. Since α<β, and (a/b<e/f), when comparing a ratio 1=(a*P(t)*α/{b*PA1(t)*(1−α)} of a component of assisting torque calculated based on a pedal torque to a component of assisting torque calculated based on the average value of pedal torque in the first control with a ratio k2=(e*P(t)*β/{f*PA2(t)*(1−β)} of a component of assisting torque calculated based on pedal torque to a component of assisting torque calculated based on the average value of pedal torque in the second control, k1<k2.

Namely, compared with the first control, in the second control, the component of assisting torque calculated based on (the momentary value of) the pedal torque P(t) at the time t tends to be greater than the component of assisting torque calculated based on the average values PA1(t), PA2(t) of the pedal torque. Due to this, even though t1=t2 and PA1(t)=PA2(t), according to the second control, it is easy to make the assisting torque change quickly in response to a change in the pedal torque.

In addition, since k1<k2, when the pedal torque P(t) changes, the amount of change in the pedal torque P(t) becomes greater than the amount of change in the average value of the pedal torque. Due to this, the amount of change in the assisting torque to meet a change in the pedal torque becomes greater in the second control than in the first control.

In the example described above, while the command values T1, T2 of assisting torque are calculated based on the temporal average value of the pedal torque, the present invention is not limited thereto. For example, as will be described next with respect to expressions (3), (4), command values T1, T2 of assisting torque may be calculated based on an average value of pedal torque per a predetermined number of rotations of the crank shaft 41.

In the first control, assisting torque T1(t) is calculated based on the following expression (3).

$$T1(t)=\{a*P(t)*\alpha+b*QA1(t)*(1-\alpha)\}*A1 \quad (3)$$

Where, P(t) is a pedal torque at the current time t, QA1(t) is an average value of a pedal torque during the past 1/g rotation of the crank shaft 41 at the current time t, a, b and A1 are constants, and $\alpha$ is a variable of $0 \le \alpha \le 1$.

In the second control, assisting torque T2(t) is calculated based on the following expression (4).

$$T2(t)=\{e*P(t)*\beta+f*QA2(t)*(1-\beta)\}*A2 \quad (4)$$

Where P(t) is pedal torque at the current time t, QA2(t) is an average value of pedal torque during the past 1/h (g≤h) rotation of the crank shaft 41 at the current time t, e, f and A2 are constants, (a/b<e/f), $\beta$ is a variable of $0 \le \beta \le 1$, and in relation to $\alpha$, $\beta$, $\alpha < \beta$.

For example, in the first control, with g set at 1 or g=1, assisting torque T1(t) may be calculated from an average value of pedal torque during one rotation of the crank shaft 41, while in the second control, with h set at 2 (h=2), assisting torque T2(t) may be calculated from an average value of pedal torque during a half rotation of the crank shaft 41.

In this case, too, the time required for the assisting torque to change to meet a change in the pedal torque is shorter in the second control than in the first control. Additionally, the amount of change in the assisting torque to meet a change in the pedal torque becomes greater in the second control than in the first control.

In the expressions (1) to (4) described above, $\alpha$ and $\beta$ are preferably set as follows.

The motor controller 95 may set $\alpha$ and $\beta$ based on a crank speed c calculated from a change in the pedal torque or a crank speed c calculated from an output of the crank rotation detector 58 such that $\alpha$ and $\beta$ become greater as the crank speed c becomes slower and $\alpha$ and $\beta$ become smaller as the crank speed c becomes faster.

Alternatively, the motor controller 95 may set $\alpha$ and $\beta$ based on a wheel speed v calculated from an output of a wheel speed sensor such as the front wheel speed sensor 37 or the rear wheel speed sensor 96 such that $\alpha$ and $\beta$ become greater as the wheel speed v becomes slower and $\alpha$ and $\beta$ become smaller as the wheel speed v becomes faster.

Further, the motor controller 95 may set $\alpha$ and $\beta$ based on the crank speed c and the wheel speed v such that $\alpha$ and $\beta$ become greater as the crank speed c becomes slower, $\alpha$ and $\beta$ become smaller as the crank speed c becomes faster, $\alpha$ and $\beta$ become greater as the wheel speed v becomes slower, and $\alpha$ and $\beta$ become smaller as the wheel speed v becomes faster.

In this way, by setting $\alpha$ and $\beta$ so as to become greater or smaller according to either of the crank speed c and the wheel speed v or both of the crank speed c and the wheel speed v, a strong assisting torque is obtained quickly at the start of propelling the bicycle or smooth assisting torque is obtained while propelling the bicycle at a cruising speed, thus making it possible to obtain an assisting torque suitable for these situations.

The constants a, b, e, f, A1 and A2 are preset values which are recorded in the memory 98, for example. Alternatively, the constants a, b, e, f, A1 and A2 may be changed by the user. Constants a and e may be equal to or different from each other. Constants b and f may be equal to or different from each other. A1 and A2 may be equal to or different from each other.

According to preferred embodiments of the present invention, the assisting torque is outputted from the electric motor 60 by the first control and the second control such that the rider feels a different assisting sensation than the rider feels under the first control.

The second control causes a change in the assisting torque more quickly to meet a change in the pedal torque than the first control, and the second control changes the assisting torque more greatly to meet a change in the pedal torque than the first control. Due to this, for example, when the user selects the second control at the start of propelling the bicycle, the assisting torque is obtained as soon as the pedal torque is inputted, and the strong assisting torque is obtained in response to the inputted pedal torque.

The time required for the assisting torque to change to meet a change in the pedal torque is longer in the first control than in the second control, and the amount of change in the assisting torque to meet a change in the pedal torque is smaller in the first control than in the second control. Consequently, since it is difficult for the assisting torque to change even though the pedal torque changes, for example, when the user selects the first control while propelling the bicycle at cruising speeds, the user feels a comfortable assisting sensation.

In this way, in the electrically assisted bicycle 1 according to the present preferred embodiment, since the range of output characteristics of the electric motor 60 is wide, the convenience of the user is enhanced.

Alternatively, for example, when the user propels the bicycle continuously in the assisted propelling mode on an upward slope with fewer bumps than in a downhill course or the like, the user executes the first control until a summit is reached, and thereafter when propelling the bicycle on a downward slope, the user switches from the first control to the second control to realize a quick propelling of the bicycle through the highly responsible assist.

In the description above, the assisting torque is described as being calculated preferably from the pedal torque and the average value of the pedal torque, the present invention is not limited thereto. A configuration may be used in which the assisting torque is calculated based on the vehicle speed or the crank rotation speed in addition to the pedal torque and the average value of the pedal torque.

In switching between the first control and the second control while the vehicle is being propelled, in case an amount of change from the current command value to the command value calculated after the switching of the controls exceeds a predetermined upper limit value, the motor controller 95 may set the command value at the upper limit value in place of the calculated command value.

By controlling the motor in the way described above, the amount of change in the command value is significantly reduced or minimized, such that the switching between the first control and the second control is executed smoothly.

As shown in FIG. 1, an indicator 67 may be provided on the electrically assisted bicycle 1, and this indicator 67 is illuminated in different colors or different patterns in association with the motor controller 95 executing the first control or the second control. Here, the different patterns are, for example, arbitrary patterns of turning off, turning on, and flashing of the indicator 67.

As a result of the indicator 67 being provided, by looking at the indicator 67, the user is able to verify easily which of the first control and the second control is currently being executed. The illuminated state of the indicator 67 is easily grasped by the user without watching the indicator 67. Due to this, the provision of the indicator 67 is preferable when frequently switching between the first control and the second control while the rider is propelling the vehicle on a riding path with severe ups and downs.

In a preferred embodiment of the present invention, while the first control and the second control are sequentially switched by the user operating the operator 56, the switching method between the first control and the second control is not limited to the example described above.

For example, a configuration may be used in which the second control is executed only while the user is operating the operator 56 (the user is pushing a knob or gripping a lever), whereas the first control is executed only while the user does not operate the operator 56.

Alternatively, a configuration may be used in which the first control is selected after a power supply of the vehicle is switched on, and the second control is then selected when the user operates the operator 56 so that the second control continues to be selected after the operation of the operator 56 by the user until the user operates the operator 56 again.

Alternatively, a configuration may be used in which the control is reset when the power supply of the vehicle is switched off and the first control is selected after the power supply is switched on again. Alternatively, a configuration may be used in which the second control is selected even after the power supply is switched on again until the operator 56 is operated again even though the power supply of the vehicle is switched off.

Further, the operator 56 may include modes that are selected by operating an electric controller via a knob or a switch or an assist selection signal received from a mobile smartphone.

The operator 56 may include a mechanical configuration such as a lever, a toggle, a knob, a switch or the like. For example, a configuration may be used in which, as long as a switch stays in a first control position or a second control position, the selection of the first control or the second control continues to be held whether the power supply is switched on or off.

In the electrically assisted bicycle 1 according to a preferred embodiment of the present invention, in addition to the pedal torque assisting function in which the motor controller 95 assists the rider in pressing the pedals when the rider propels the bicycle 1, the electrically assisted bicycle 1 may be equipped with a walk-push function in which the electric motor 60 is caused to output a walk-push assisting torque which assists the rider in pushing the bicycle 1 when the rider pushes the bicycle 1 while walking.

In the case of the vehicle being equipped with the walk-push function, a walk-push operator which causes the walk-push assisting torque to be generated and the operator which selects the first control or the second control may be mounted separately from each other.

Alternatively, a configuration may be used in which a single operator is mounted, so that pressing the operator once selects the first control or the second control and pressing the operator longer generates the walk-push assisting torque.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrically assisted bicycle comprising:
a crank shaft;
pedals which rotate the crank shaft;
an electric motor that assists a force with which a rider presses the pedals;
a torque sensor which outputs a signal corresponding to a pedal torque exerted on the pedals by the rider;
a controller configured or programmed to calculate a command value which determines a magnitude of an assisting torque based on at least an output of the torque sensor; and
an operator operated by the rider; wherein
the controller is programmed or configured to, in response to an operation of the operator by the rider, switch between:
a first control in which the assisting torque assists the rider in pressing the pedals; and
a second control in which a time required for the assisting torque to change to meet a change in the pedal torque is shorter and an amount of change in the assisting torque to meet a change in the pedal torque is greater than in the first control.

2. The electrically assisted bicycle according to claim 1, wherein:
$P(t)$ is a pedal torque at a current time t;
$PA1(t)$ is an average value of a pedal torque during a span $(t-t1)$;
$PA2(t)$ is an average value during a span $(t-t2, |t-t2| \leq |t-t1|)$;
a, b, e, f, A1, and A2 ($a/b < e/f$) are constants; and
$\alpha$ and $\beta$ are variables ($0 \leq \alpha \leq 1$, $0 \leq \beta \leq 1$, $\alpha < \beta$);
the controller is configured or programmed to calculate a command value T1 which is calculated by the first control using expression (1), and calculate a command value T2 which is calculated by the second control using expression (2):

$$T1(t)=\{a*P(t)*\alpha+b*PA1(t)*(1-\alpha)\}*A1 \quad (1); \text{ and}$$

$$T2(t)=\{e*P(t)*\beta+f*PA2(t)*(1-\beta)\}*A2 \quad (2).$$

3. The electrically assisted bicycle according to claim 1, wherein:
$P(t)$ is a pedal torque at a current time t;
$QA1(t)$ is an average value of a pedal torque during a past $1/g$ rotation of the crank shaft at the current time t;
$QA2(t)$ is an average value of pedal torque during a past $1/h$ ($g \leq H$) rotation of the crank shaft;
a, b, e, f, A1, and A2 ($a/b < e/f$) are constants; and
$\alpha$ and $\beta$ are variables ($0 \leq \alpha \leq 1$, $0 \leq \beta \leq 1$, $\alpha < \beta$);
the controller is configured or programmed to calculate a command value T1 which is calculated by the first control using expression (3), and calculate a command value T2 which is calculated by the second control using expression (4):

$$T1(t)=\{a*P(t)*\alpha+b*QA1(t)*(1-\alpha)\}*A1 \quad (3); \text{ and}$$

$$T2(t)=\{e*P(t)*\beta+f*QA2(t)*(1-\beta)\}*A2 \quad (4).$$

4. The electrically assisted bicycle according to claim 2, wherein the controller is configured or programmed to set $\alpha$ and β based on a crank speed c calculated from a change in pedal torque or a crank speed c calculated from an output of the crank rotation detector such that α and β become greater as the crank speed c becomes slower and α and β become smaller as the crank speed c becomes faster.

5. The electrically assisted bicycle according to claim 3, wherein the controller is configured or programmed to set α and β based on a crank speed c calculated from a change in pedal torque or a crank speed c calculated from an output of the crank rotation detector such that α and β become greater as the crank speed c becomes slower and α and β become smaller as the crank speed c becomes faster.

6. The electrically assisted bicycle according to claim 2, further comprising a wheel speed sensor that outputs a signal corresponding to a wheel speed of a wheel; wherein
the controller is configured or programmed to set α and β based on a wheel speed v calculated from an output of the wheel speed sensor such that α and β become greater as the wheel speed v becomes slower and α and β become smaller as the wheel speed v becomes faster.

7. The electrically assisted bicycle according to claim 3, further comprising a wheel speed sensor that outputs a signal corresponding to a wheel speed of a wheel; wherein
the controller is configured or programmed to set α and β based on a wheel speed v calculated from an output of the wheel speed sensor such that α and β become greater as the wheel speed v becomes slower and α and β become smaller as the wheel speed v becomes faster.

8. The electrically assisted bicycle according to claim 1, wherein the controller is programmed or configured to, when switching between the first control and the second control while the vehicle is being propelled, set the command value at an upper limit value in place of the calculated command value in case an amount of change from the current command value to the command value calculated after the switching between the first control and the second control exceeds the upper limit value.

9. The electrically assisted bicycle according to claim 2, wherein the controller is programmed or configured to, when switching between the first control and the second control while the vehicle is being propelled, set the command value at an upper limit value in place of the calculated command value in case an amount of change from the current command value to the command value calculated after the switching between the first control and the second control exceeds the upper limit value.

10. The electrically assisted bicycle according to claim 3, wherein the controller is programmed or configured to, when switching between the first control and the second control while the vehicle is being propelled, set the command value at an upper limit value in place of the calculated command value in case an amount of change from the current command value to the command value calculated after the switching between the first control and the second control exceeds the upper limit value.

11. The electrically assisted bicycle according to claim 1, further comprising an indicator that is illuminated in different colors or different patterns in association with the controller executing the first control or the second control.

12. The electrically assisted bicycle according to claim 2, further comprising an indicator that is illuminated in different colors or different patterns in association with the controller executing the first control or the second control.

13. The electrically assisted bicycle according to claim 3, further comprising an indicator that is illuminated in different colors or different patterns in association with the controller executing the first control or the second control.

14. The electrically assisted bicycle according to claim 8, further comprising an indicator that is illuminated in different colors or different patterns in association with the controller executing the first control or the second control.

* * * * *